United States Patent

[11] 3,590,981

| [72] | Inventor | Philip R. Adrian |
| | | Escalon, Calif. |
| [21] | Appl. No. | 821,004 |
| [22] | Filed | May 1, 1969 |
| [45] | Patented | July 6, 1971 |
| [73] | Assignee | Fruit Harvesting Co., Inc. |
| | | Escalon, Calif. |

[54] GUIDE WITH ENERGY-ABSORBING BAFFLES
3 Claims, 5 Drawing Figs.

[52] U.S. Cl. .................................................. 198/72,
193/7, 193/15, 193/27, 198/49, 198/51
[51] Int. Cl. ........................................................ B65g 47/44,
B65g 11/08
[50] Field of Search ........................................... 193/7, 15,
32, 27; 198/45, 49, 51, 72

[56] References Cited
UNITED STATES PATENTS

| 234,985 | 11/1880 | Huttner ...................... | 193/27 |
| 243,403 | 6/1881 | Randol ........................ | 193/27 |
| 248,912 | 11/1881 | Campbell .................... | 193/27 |
| 969,372 | 9/1910 | Hottel ......................... | 193/27 |
| 2,032,258 | 2/1936 | Caton .......................... | 193/7 |
| 2,693,264 | 11/1954 | Waterbury ................... | 193/7 |
| 2,925,162 | 2/1960 | Tuncg .......................... | 193/15 X |
| 3,187,872 | 6/1965 | Hill et al. ..................... | 193/7 |
| 3,194,375 | 7/1965 | Callow ......................... | 193/7 |
| 3,258,142 | 6/1966 | Girardi ......................... | 193/7 X |

*Primary Examiner*—Evon C. Blunk
*Assistant Examiner*—W. Scott Carson
*Attorney*—Mellin, Moore and Weissenberger ABSTRACT: An orchard harvester including a guide adapted to receive fruit from a conveyor and guide it into a crate, the guide having thereon a plurality of stacked, spaced baffles which allow the fruit to fall through the guide and into the crate, meanwhile absorbing the energy of the falling fruit and limiting the acceleration thereof.

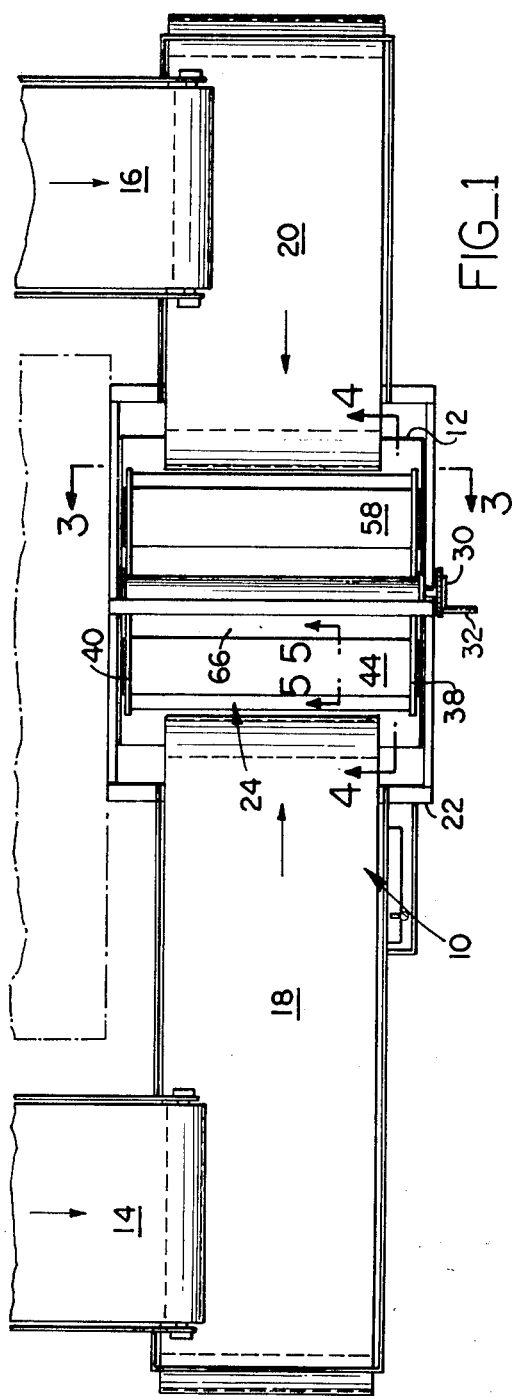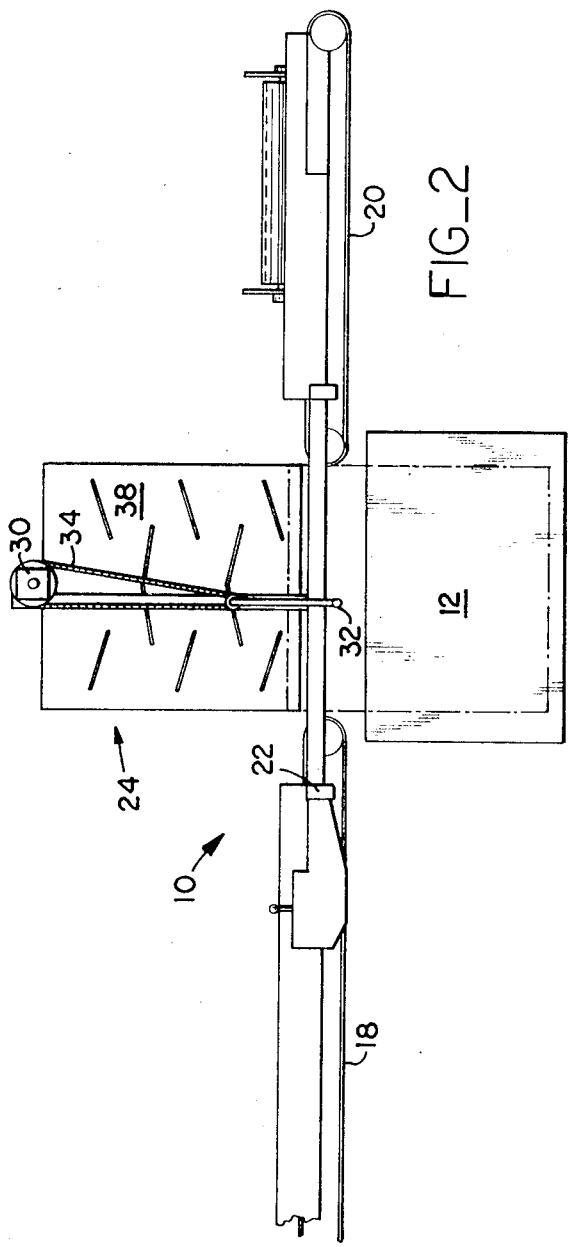

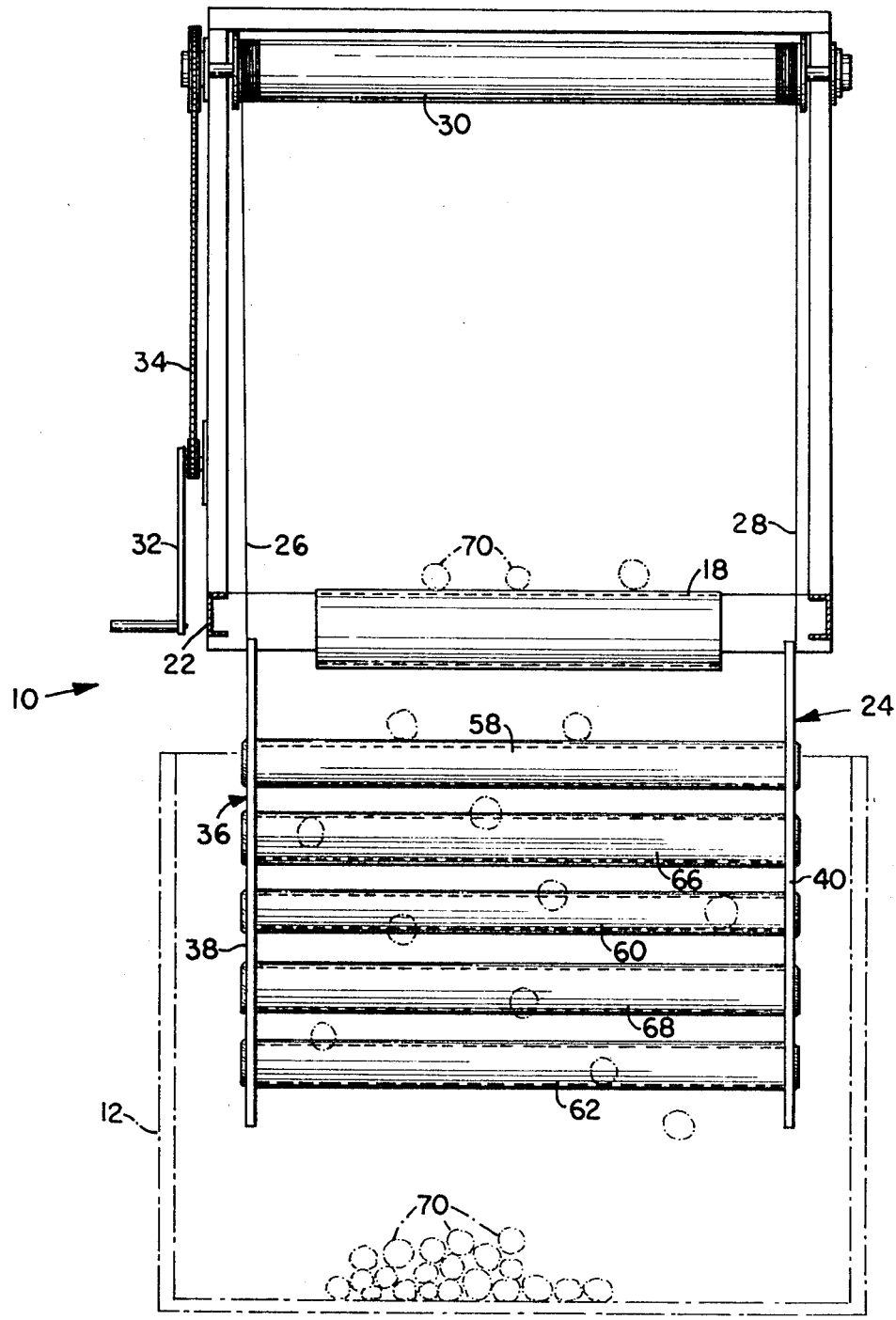
FIG_3
INVENTOR.
PHILIP R. ADRIAN

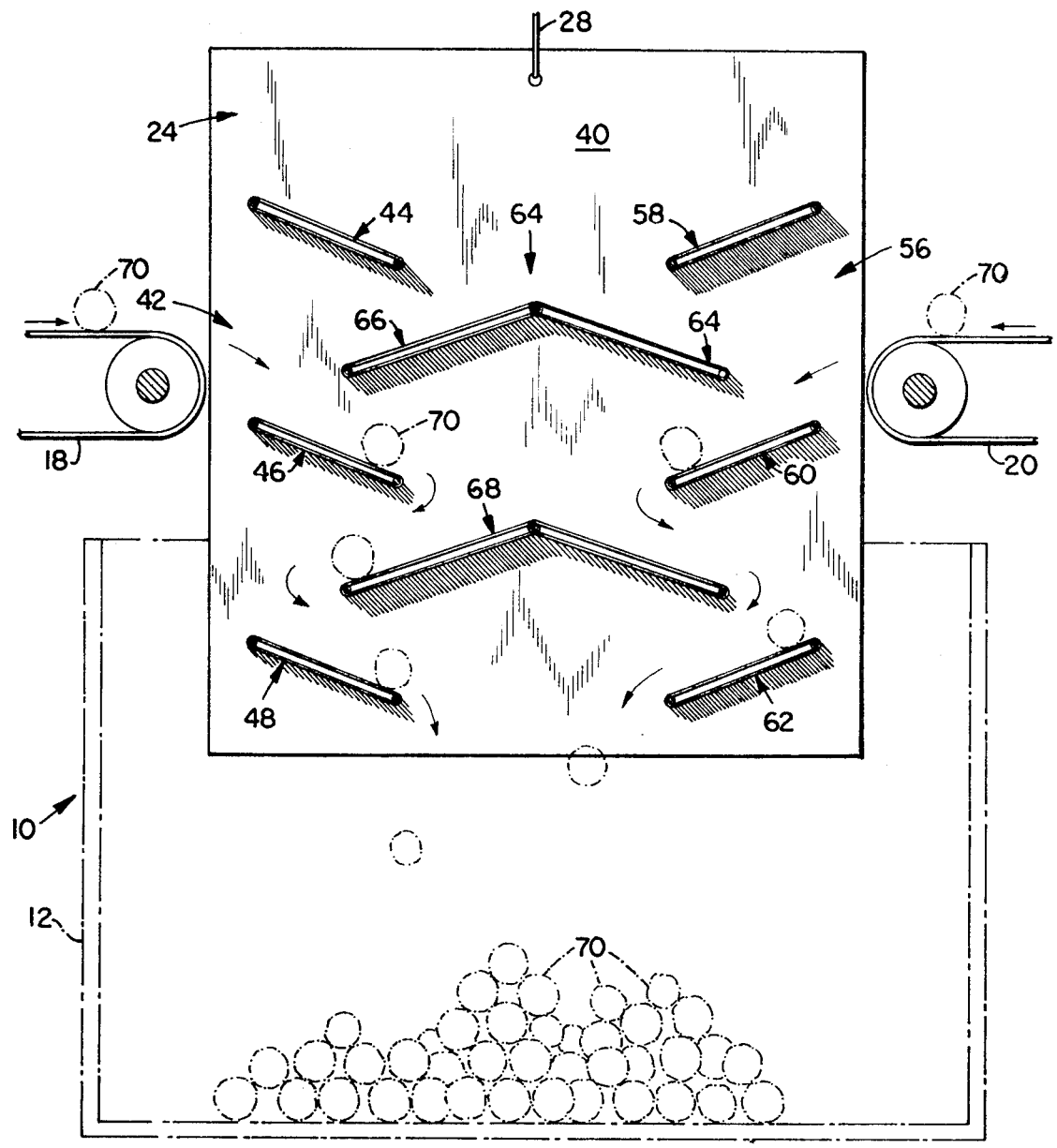
FIG_4
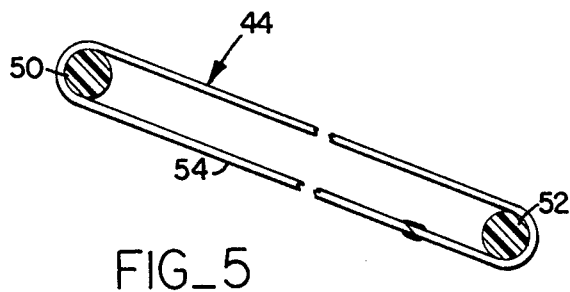
FIG_5
INVENTOR.
PHILIP R. ADRIAN
BY
Mellin, Moore + Weissenberger
ATTORNEYS

GUIDE WITH ENERGY-ABSORBING BAFFLES

BACKGROUND OF THE INVENTION

As is well known, it is extremely important, in the process of harvesting, to protect fruit being harvested from bruising or other damage. This means that the fruit must not be allowed to freely drop from too great a height onto a hard surface, or else bruising is sure to occur.

Generally, in such a harvesting operation, fruit is conveyed to a point over a crate, and then is dropped from the end of the conveyor into the crate. This means that, depending on how full the crate is with fruit, the fruit entering the crate may drop a quite substantial distance and land either on the bottom of the crate or on other fruit already in the crate. Dropping the fruit such a substantial distance, of course, results in damage thereto.

It is an object of this invention to provide a structure for guiding fruit or the like fed thereon into a bin in a manner which keeps the fruit from being damaged.

It is a further object of this invention to provide a structure which is capable of fulfilling the above object no matter to what extent the bin is filled with fruit or the like.

It is a still further object of the invention to provide a structure which, while fulfilling the above objects, is extremely simple, inexpensive, and maintenance-free.

SUMMARY OF THE INVENTION

Broadly stated, the inventive system for guiding fruit or the like into a receptacle comprises a support structure positioned over the receptacle. Feeding means are included for feeding the fruit laterally into the support structure, and the support structure can be raised or lowered relative to the feeding means and receptacle. A plurality of baffles are supported by the support structure and are positioned to receive thereon the fruit fed laterally into the support structure and allow the fruit to fall into the receptacle, meanwhile limiting the acceleration of the fruit as it falls. Means are included for raising and lowering the support structure relative to the feeding means and receptacle.

BRIEF DESCRIPTION OF THE DRAWINGS

These and other objects of the invention will become apparent from a study of the following description and drawings, in which:

FIG. 1 is a plan view of the system for guiding fruit or the like into a receptacle;
FIG. 2 is a side elevation of the system of FIG. 1;
FIG. 3 is a sectional view taken along the line 3–3 of FIG. 1;
FIG. 4 is a sectional view taken along the line 4–4 of FIG. 1;
FIG. 5 is a sectional view taken along the line 5–5 of FIG. 1.

DESCRIPTION OF THE PREFERRED EMBODIMENT

Shown generally at 10 in FIGS. 1 and 2 is a system for guiding fruit or the like, such as peaches, into a crate or bin 12, which acts as a receptacle. Such system 10 includes conveyors 14 and 16 which convey or feed the fruit onto transverse conveyors 18, 20 respectively. The bin 12 is positioned under the inner ends of conveyors 18, 20. The conveyors 14, 16, 18, 20 and bin 12 are supported relative to the frame 22 of the system 10.

Disposed between the inward ends of the conveyors 18, 20 is a guide 24. Such guide 24 is attached to lines 26, 28 (FIG. 3) which wrap around a roller 30 supported by frame 22. A hand crank 32 is supported by frame 22 and, through a belt 34, turns the roller 30 so that the guide 24 may be raised and lowered relative to conveyors 18, 20 and bin 12.

The guide 24, as best shown in FIGS. 3 and 4, includes a support structure 36 made up of a pair of generally parallel spaced wooden plates 38, 40. Extending between the plates 38, 40 and supported thereby are a first set of baffles 42. This first set of baffles 42 is made up of a plurality of baffles 44, 46, 48. Each of the baffles, as 44, is made up of a pair of longitudinal elastic members 50, 52 each of which is fixed to and runs from one plate 38 to the other plate 40, and canvas cloth 54 disposed around the elastic members 50, 52 (FIG. 5). The baffles 44, 46, 48 are disposed atop one another in spaced relationship adjacent the area into which the conveyor 18 is positioned to feed. Each of the baffles 44, 46, 48 slopes downwardly inwardly of the conveyor 18.

Extending between the plates 38, 40 and supported thereby are a second set of baffles 56. This second set of baffles is made up of a plurality of baffles 58, 60, 62, each of which is made up of longitudinal elastic members and canvas cloth, similar to baffle 44. The baffles 58, 60, 62 are disposed atop one another in spaced relationship adjacent the area into which conveyor 20 is positioned to feed. Each of the baffles 48, 60, 62 slopes downwardly inwardly of the conveyor 20.

Disposed between the first and second sets of baffles 42 and 56 is a third set of baffles 64 which extend between and are supported by plates 38, 40. The third set of baffles 64 is made up of baffles 66, 68, each made up of a plurality of longitudinal elastic members and canvas cloth, similar to baffle 44. The baffles 66, 68 are disposed atop one another in spaced relationship. The baffle 66 slopes from its midpoint outwardly downwardly toward the first and second sets of baffles 42 and 56. One side of baffle 66 slopes between baffles 44, 46, and the other side slopes between baffles 58, 60. The baffle 68 also slopes toward the first and second sets of baffles 42 and 56. One side of baffle 68 slopes between baffles 46, 48, and the other side slopes between baffles 60, 62. It will be understood that rigid rods could be substituted for any of the longitudinal elastic members which form part of any of the baffles.

In the operation of the system 10, fruit or the like, such as peaches 70, is fed by conveyors 18, 20 laterally into the support structure 36 between plates 38, 40. With the bin 12 completely empty, guide 24 is placed in its lowermost position relative thereto (FIG. 3) by means of handcrank 32. Peaches 70 will be fed by conveyors 18, 20 onto baffles 44, 58, roll downwardly and inwardly, fall on baffle 66, roll downwardly and outwardly, and so on with the remaining lower baffles until they land on the bottom of the bin 12. In this way, the peaches 70 are limited in acceleration as they fall, and will not be damaged.

As the bin 12 fills up with peaches 70, the guide 24 is raised sufficiently to allow the peaches 70 to build up (FIG. 4). In this intermediate position, peaches 70 will be fed by conveyors 18, 20 onto baffles 46, 60, roll downwardly and inwardly, fall on baffle 68, roll downwardly and outwardly, and so on, as indicated by the arrows in FIG. 4. The peaches 70 then fall on top of the peaches 70 which have accumulated in the bottom of the bin 12. Again, the baffles act to limit the acceleration of the peaches 70 as they fall and are effective even though the level of peaches 70 in the bin 12 has risen.

Finally, when the bin 12 is substantially filled, the guide 24 may be raised to a point (FIG. 2) above the top of bin 12 so the peaches 70 can fall directly into the bin. In such a situation, the guide 24 is not needed since the peaches 70 need only drop a short distance onto the top of the peaches 70 accumulated in the bin 12.

It will be seen that herein is provided a system which includes a device for guiding fruit or the like into a bin in a manner which keeps the fruit from being damaged. This is true regardless of the extent to which the bin itself is filled with fruit. The system itself, it will be seen, is extremely simple, inexpensive, and maintenance-free, and has been found extremely effective in use.

I claim:
1. A system for guiding fruit or the like into a receptacle comprising:
   a. a support structure positioned over the receptacle;
   b. feeding means for feeding the fruit laterally into the support structure, said support structure being raisable and lowerable relative to the feeding means and receptacle;

c. a plurality of spaced, vertically disposed baffles fixedly supported by the support structure and staggered thereon in such a manner as to receive thereon the fruit fed laterally into the support structure and allow the fruit to fall from one of said baffles to another and into the receptacle, meanwhile limiting the acceleration of the fruit as it falls, the position of each of said baffles on said support structure being related to the position of said support structure relative to both said receptacle and said feeding means whereby fruit guided into said support structure initially contacts one of said baffles at one level related to the position of said support structure relative to both said receptacle and said feeding means and another of said baffles at another level related to the position of said support structure relative to both said receptacle and said feeding means;

d. means for raising and lowering the support structure to the feeding means and receptacle thus presenting different levels of said baffles to fruit being guided into said support structure; and e. said support structure comprising a pair of generally parallel spaced plates between which the fruit is fed, and wherein each baffle comprises a plurality of longitudinal elastic members each fixed to and running from one plate to the other, and an energy absorbing cloth disposed around each plurality of longitudinal elastic members.

2. A system for guiding fruit or the like into a receptacle comprising:

a. a support structure positioned over the receptacle and comprising a pair of spaced plates;

b. first and second conveyors, each positioned to feed fruit laterally into the support structure from opposite sides thereof, said support structure being raisable and lowerable relative to the conveyors and receptacle;

c. a first set of baffles extending between the plates of the support structure and supported thereby, the first set of baffles being disposed atop one another in spaced relationship adjacent the area of the support structure into which the first conveyor feeds, each of the first set of baffles sloping downwardly inwardly of the first conveyor;

d. a second set of baffles extending between the plates of the support structure and supported thereby, the second set of baffles being disposed atop one another in spaced relationship adjacent the area of the support structure into which the second conveyor feeds, each of the second set of baffles sloping downwardly inwardly of the second conveyor;

e. a third set of baffles disposed atop one another in spaced relationship between the first and second sets of baffles, each of the third set of baffles sloping from its midpoint outwardly downwardly toward the first and second sets of baffles, and between a pair of the first set of baffles and between a pair of the second set of baffles, such first, second and third sets of baffles allowing the fruit to fall into the receptacle, meanwhile limiting the acceleration of the fruit in its fall; and f. means for raising and lowering the support structure relative to the first and second conveyors and receptacle.

3. A system according to claim 2 wherein each baffle comprises a plurality of longitudinal elastic members, each fixed to and running from one plate to the other, and canvas cloth disposed around each plurality of longitudinal members.